United States Patent

Taga et al.

[11] Patent Number: 5,822,095
[45] Date of Patent: Oct. 13, 1998

[54] OPTICAL ADD-DROP MULTIPLEXER

[75] Inventors: Hidenori Taga; Takayuki Miyakawa, both of Saitama; Shigeyuki Akiba, Tokyo, all of Japan

[73] Assignee: Kokusai Denshin Denwa Kabushiki Kaisha, Tokyo, Japan

[21] Appl. No.: 702,274

[22] Filed: Aug. 23, 1996

[30] Foreign Application Priority Data

Sep. 19, 1995 [JP] Japan .................................. 7-263684

[51] Int. Cl.$^6$ ...................................................... H04J 14/02
[52] U.S. Cl. ........................... 359/127; 359/129; 359/130; 385/24; 385/27
[58] Field of Search .................................... 359/130, 127, 359/126, 129; 385/37, 24, 27, 47, 49

[56] References Cited

U.S. PATENT DOCUMENTS

| | | | |
|---|---|---|---|
| 4,543,961 | 10/1985 | Brown ....................................... | 359/127 |
| 4,973,124 | 11/1990 | Kaede ....................................... | 359/127 |
| 5,479,082 | 12/1995 | Calvani et al. ........................... | 359/127 |

OTHER PUBLICATIONS

Giles et al, Low Loss Add/Drop Multiplexers for WDM Lightwave Networks, Tenth International Conference on Integrated Optics and Optical Fibre Communication, vol. 3, Hong Kong, Jun. 1995, pp. 66–67.

Jones et al, Optical Wavelength Add–Drop Multiplexer in Installed Submarine WDM Network, Electronics Letters, vol. 31, No. 24, pp. 2117–2118, Nov. 1995.

E.L. Goldstein et al. "Multiwavelength fiber–amplifer cascades in undirectional interoffice ring networks"; OFC/IOOC 93, Technical Digest, vol. 4, Conference Edition, Paper TuJ3, pp. 44–46, 1993.

*Primary Examiner*—Leslie Pascal
*Attorney, Agent, or Firm*—Westman, Champlin & Kelly, P.A.

[57] ABSTRACT

An object of the present invention is to provide an optical add-drop multiplexer capable of giving improved characteristics with a simple, inexpensive arrangement which needs not a corresponding number of optical bandpass filters to the wavelength components of a light signal to be carried. The wavelength components $\lambda 1$ to $\lambda n$ of an input n-wave signal is received by an input optical fiber and transmitted through an optical circulator and an optical fiber to an optical bandpass filter which allows a specific wavelength $\lambda 1$ to pass but rejects the other wavelengths $\lambda 2$ to $\lambda n$. While the rejected wavelengths $\lambda 2$ to $\lambda n$ are returned back to the optical fiber, the specific wavelength $\lambda 1$ runs through another optical fiber and another optical circulator and then is dropped from an output optical fiber. Meanwhile, another signal component of the wavelength $\lambda 1$ is added and introduced from another input optical fiber through the another optical circulator and the another optical fiber to the optical bandpass filter. Upon the added wavelength $\lambda 1$ having passed the optical bandpass filter and entering the optical fiber, it is mixed with the rejected wavelengths $\lambda 2$ to $\lambda n$. A resultant sum signal of the full wavelengths $\lambda 1$ to $\lambda n$ is passed through the optical circulator and transmitted from an output optical fiber.

5 Claims, 6 Drawing Sheets

5,822,095

OPTICAL ADD-DROP MULTIPLEXER

BACKGROUND OF THE INVENTION

1. Field of the Invention

The present invention relates to an optical add-drop multiplexer (referred to as an optical ADM apparatus hereinafter) installed in an optical wavelength-division multiplex communications network for extracting a specific wavelength from an optical wavelength-division multiplexed signal and simultaneously complementing the optical wavelength-division multiplexed signal with an optical signal component of which wavelength is identical to the extracted specific wavelength.

2. Description of the Related Art

The optical wavelength-division multiplex communications network based on the optical wavelength-division multiplexed signals has been focused for practical use as a bulk size communications network. In the network, a plurality of light signals are multiplexed and transmitted along a single optical fiber line. More specifically, as wavelengths of their respective light signals are assigned to different receivers in the network, multiple-to-multiple communications can be implemented.

FIG. 8 illustrates a ring-type structure of the optical wavelength-division multiplex communications network in which three different wavelengths λ1, λ2, and λ3 of a light signal are transmitted from a node 0 to nodes 1, 2, and 3 respectively. The node 1 receives a data of information from the node 0 on extracting the wavelength λ1 from the light signal, and simultaneously complements the light signal with a signal component having the wavelength λ1 to send it back to the node 0. At the other nodes 2 and 3, their respective wavelengths λ2 and λ3 are extracted and added for exchange of information with the node 0. As understood, each node extracts its corresponding wavelength from the light signal and in turn adds a signal component having the same wavelength. This function is implemented in the form of an optical ADM apparatus.

FIG. 9 shows an example of the optical ADM apparatus for use in the structure shown in FIG. 8 (as depicted in OFC/IOOC 93, Paper TuJ3, by E. L. Goldstein et al). The nodes defined by the optical ADM apparatuses are identical to each other in the construction, except optical wavelengths to be handled, and the optical ADM apparatus of the node 1 will be explained as a common model referring to FIG. 9. As above mentioned, the optical ADM apparatuses of their respective nodes are identical to each other except their corresponding wavelengths. This allows the overall system of the network to be simplified in which the optical ADM apparatuses include common components.

As shown, an optical wavelength-division multiplexed signal is divided by an optical wavelength-division demultiplexer 21 to three different wavelength components λ1, λ2, and λ3. The wavelength λ1 is passed through an optical bandpass filter 22a for extraction at the node 1. The other wavelength components λ2 and λ3 are passed through optical bandpass filters 22b and 22c respectively and then, mixed by an optical wavelength-division multiplexer 23 with a signal component λ1 introduced from the node 1. A resultant sum signal of the wavelength-division multiplexed mode is further transmitted along an optical passage to the next node. It is noted that the two wavelength components λ2 and λ3 are separated from each other by their respective optical bandpass filters 22b and 22c in order to prevent interference between multiple optical paths extending from the optical demultiplexer 21 and the optical multiplexer 23 for transmission of the wavelength components of the light signal.

It is advantageous that such a conventional optical ADM apparatus as shown in FIG. 9 is simple in the construction. However, the conventional optical ADM apparatus includes a predetermined number of the optical bandpass filters 22a to 22c which corresponds to a number of the wavelengths to be carried on the light signal in the network and will be increased in the cost. The more the wavelengths to be carried, the greater the number of the optical bandpass filters is needed. Also, since there are a plurality of light paths connected between the optical multiplexer 21 and the optical demultiplexer 23, wavelength components of the light signal transferred and multiplexed in the optical multiplexer 23 may interfere with each other.

SUMMARY OF THE INVENTION

It is an object of the present invention to provide an improved ADM apparatus which is simple in the construction and low in the price without the need of a corresponding number of optical bandpass filters to the wavelength components of a light signal to be carried thus eliminating the prescribed disadvantages of the prior art.

For achievement of the above object, an optical add-drop multiplexer according to the present invention is provided comprising either a couple of optical circulators and an optical bandpass filter, or an optical coupler, an optical circulator, and an optical bandpass filter. In action, a specific wavelength of an input wavelength-division multiplexed signal to be dropped and added is passed through the optical bandpass filter while the other wavelength components are rejected and returned to an incident optical fiber. On the other hand, an added wavelength is mixed, by the optical circulator or coupler connected to the incident optical fiber, with the other wavelength components rejected by the optical bandpass filter. Hence, the improved ADM apparatus of the present invention is implemented by a simple arrangement.

DETAILED DESCRIPTION OF THE PREFERRED EMBODIMENTS

Figure 1:
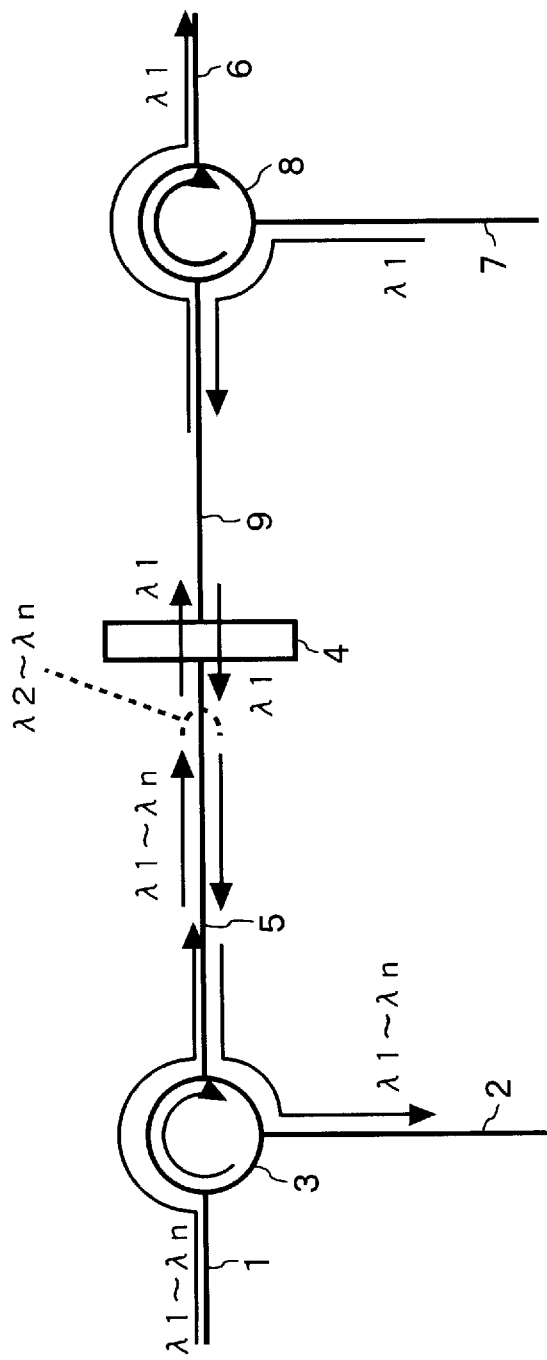
FIG. 1 is a diagram explaining a first embodiment of the present invention.

The present invention is be described in more details referring to the accompanying drawings. FIG. 1 illustrates an embodiment of an optical ADM apparatus according to the present invention.

The optical ADM apparatus of the present invention comprises an input optical fiber 1 for receiving an optical wavelength-division multiplexed signal of wavelengths $\lambda 1$ to $\lambda n$, an output optical fiber 2 for transmitting the optical wavelength-division multiplexed signal of wavelengths $\lambda 1$ to $\lambda n$, an optical circulator 3 for the wavelength-division multiplexed signal, an optical bandpass filter 4 composed of e.g. dielectric multi-layer film for passing a specific wavelength $\lambda 1$, an optical fiber 5 for communication between the optical circulator 3 and the optical bandpass filter 4, an output optical fiber 6 for extracting or dropping the specific wavelength $\lambda 1$, an input optical fiber 7 for inputting or adding the specific wavelength $\lambda 1$, an optical circulator 8 for the specific wavelength $\lambda 1$, and an optical fiber 9 for communication between the optical bandpass filter 4 and the optical circulator 8.

Figure 2:
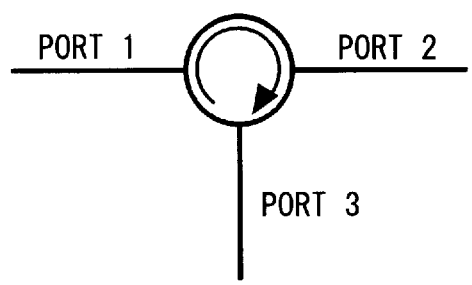
FIG. 2 is a diagram explaining the operation of an optical circulator.

As best shown in FIG. 2, three-port type of the optical circulator allows a signal of light received at the port 1 to advance to the port 2, a light signal received at the port 2 to transmit to the port 3, and a light signal received at the port 3 to move to the port 1; the light signal is directed to run in a circle.

The operation of the embodiment of FIG. 1 is explained as follows. The optical wavelength-division multiplexed signal or n-wave signal having wavelengths of $\lambda 1$ to $\lambda n$ is received at the optical fiber 1 and transmitted through the optical circulator 3 and the optical fiber 5 to the optical bandpass filter 4. The optical bandpass filter 4 allows the specific wavelength $\lambda 1$ to pass through the optical fiber 9 while the other wavelengths $\lambda 2$ to $\lambda n$ are reflected and returned to the optical fiber 5. The specific wavelength $\lambda 1$ released to the optical fiber 9 is further transmitted through the optical circulator 8 to the output optical fiber 6.

When a wavelength component $\lambda 1$ is fed from the optical fiber 7, it runs through the optical circulator 8 and the optical fiber 9 to the optical bandpass filter 4 where it is passed through the optical fiber 5. The wavelength component $\lambda 1$ is mixed with the other wavelengths $\lambda 2$ to $\lambda n$ on the optical fiber 5. A resultant sum signal of the full wavelengths $\lambda 1$ to $\lambda n$ is directed through the optical circulator 3 and transmitted from the output optical fiber 2. According to the embodiment, the optical ADM apparatus is simplified in the construction as consists mainly of two optical circulators and one optical bandpass filter.

Figure 3:
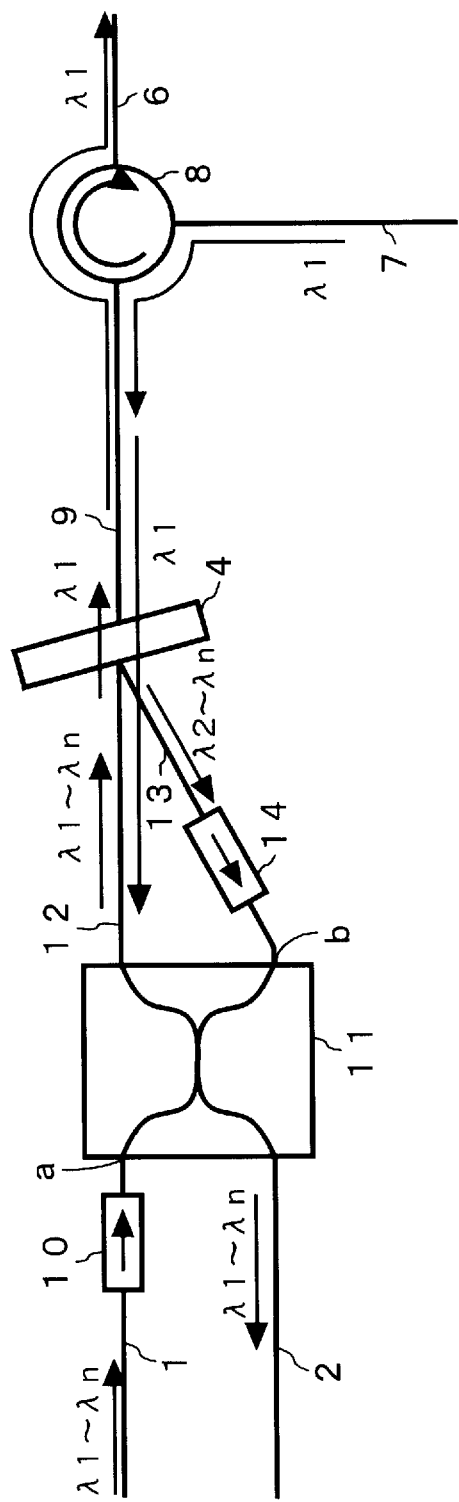
FIG. 3 is a diagram explaining a second embodiment of the present invention.

A second embodiment of the present invention is described referring to FIG. 3. An optical ADM apparatus of the second embodiment comprises two optical isolators 10 and 14 for passing a signal light in one direction, an optical fiber coupler 11, an optical fiber 12 for directing a light output of the optical fiber coupler 11 to an optical bandpass filter 4, and an optical fiber 13 for directing reflected light on the optical bandpass filter 4 to the optical fiber coupler 11. Denoted by the other numerals are components which are similar or identical to those shown in FIG. 1. In the second embodiment, the optical bandpass filter 4 is tilted at such a particular angle that most of the light output fed through the optical fiber 12 is reflected back to the optical fiber 13.

The operation of the second embodiment is explained. An n-wave signal having wavelengths $\lambda 1$ to $\lambda n$ is received at the input optical fiber 1 and transmitted through the optical isolator 10, coupler 11, and fiber 12 to the optical bandpass filter 4. At the same time, an output of light from the port b of the optical fiber coupler 11 is rejected by the optical isolator 14 and will never enter the optical fiber 13. The optical bandpass filter 4 allows a specific wavelength $\lambda 1$ to run through the optical fiber 9 and rejects the remaining wavelengths $\lambda 2$ to $\lambda n$ which are thus directed to the optical fiber 13. The specific wavelength $\lambda 1$ from the optical fiber 9 is transmitted through the optical circulator 8 and extracted from the output optical fiber 6.

When a wavelength $\lambda 1$ is added at the input optical fiber 7, it is transmitted through the optical circulator 8 and the optical fiber 9 to the optical bandpass filter 4 where it is passed through the optical fiber 12. The specific wavelength $\lambda 1$ from the optical fiber 12 is mixed with the wavelengths $\lambda 2$ to $\lambda n$ from the optical fiber 13 in the optical fiber coupler 11. A resultant sum signal including the full wavelengths $\lambda 1$ to $\lambda n$ is then transmitted from the output optical fiber 2. At the same time, an output from the port a of the optical fiber coupler 11 is rejected by the optical isolator 10 and will never run in a reverse direction along the optical fiber 1.

According to the second embodiment like the previous embodiment, the optical ADM apparatus is more simplified in the construction than a prior art ADM apparatus as consists mainly of an optical circulator, an optical fiber coupler, and an optical bandpass filter.

Figure 4:
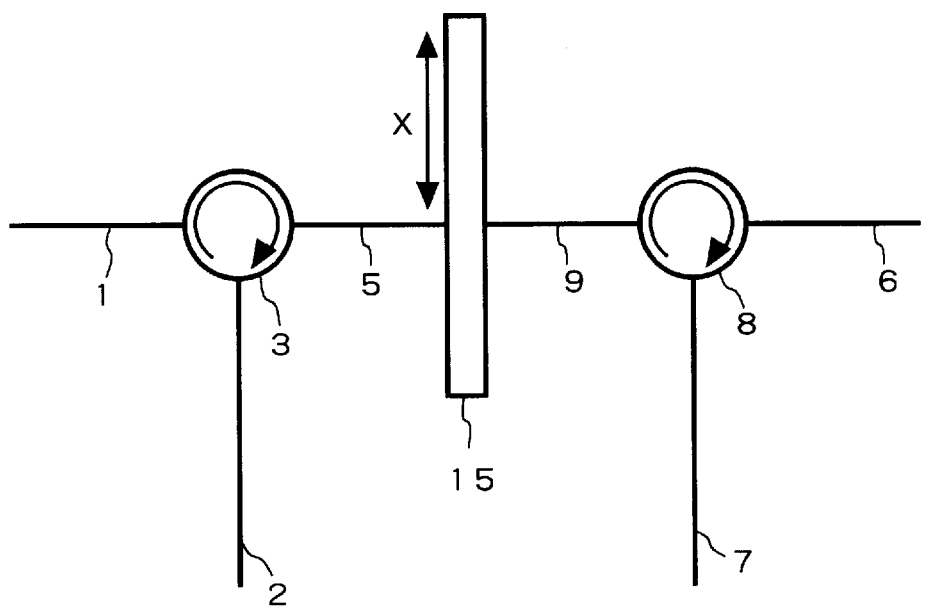
FIG. 4 is a diagram explaining a third embodiment of the present invention.

A third embodiment of the present invention is described referring to FIG. 4. FIG. 4 illustrates a primary part of the embodiment which is differentiated from FIG. 1 by the fact that an optical bandpass filter 15 is interposed between the two optical fibers 5 and 9, and the center wavelength to be transmitted through the filter 15 is varied along the x axis. The optical bandpass filter 15 may be made of a dielectric multi-layer thin film arranged so that the center wavelength to be passed is continuously variable in the direction of the x axis but constant in the direction of the z axis which is perpendicular to the x axis on the plane of the optical bandpass filter 15.

According to the third embodiment, a specific wavelength $\lambda$ to be passed from the optical fiber 5 to the optical fiber 9 can be changed by relocating the optical bandpass filter along the x axis. This allows the optical ADM apparatus to be compatible with any modification of the network system.

Figure 5:
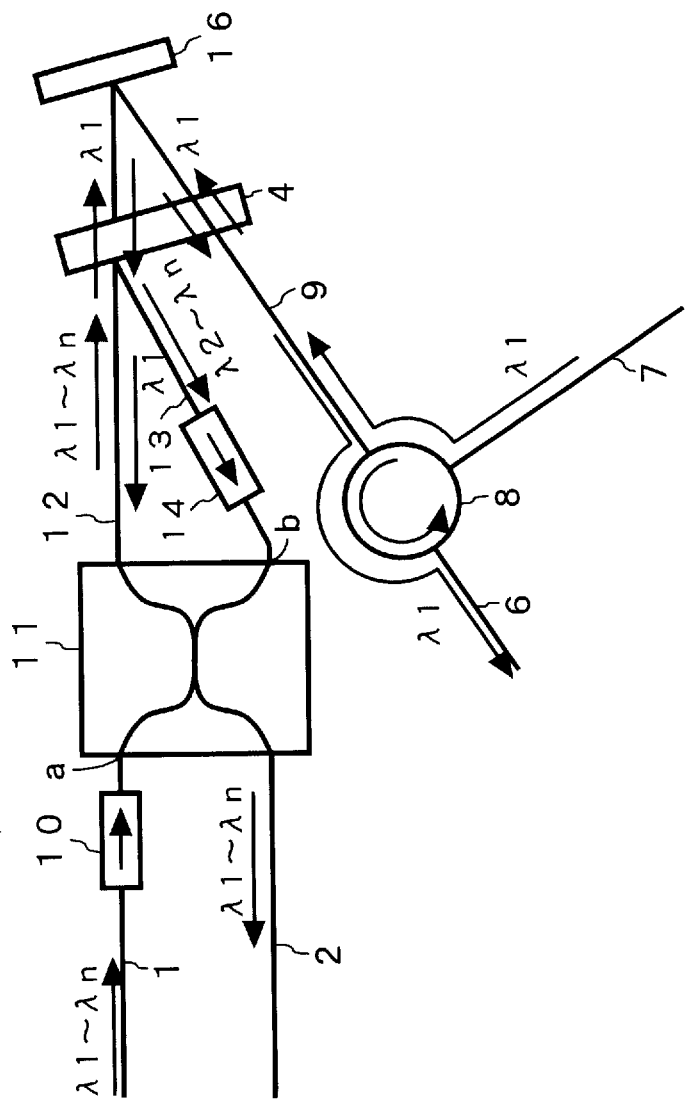
FIG. 5 is a diagram explaining a fourth embodiment of the present invention.

A fourth embodiment of the present invention is described referring to FIG. 5. This embodiment is featured with a reflector 16 which is disposed at one side of the optical bandpass filter 4 so that the wavelength $\lambda 1$ of the light signal passes across the optical bandpass filter 4 two times. The numerals other than 16 in FIG. 5 represent components identical or similar to those shown in FIG. 3.

Referring to FIG. 5, an n-wave light signal having the wavelengths $\lambda 1$ to $\lambda n$ is received at the input optical fiber 1 and transmitted through the optical isolator 10, coupler 11, and fiber 12 to the optical bandpass filter 4. At the same time, an output from the port b of the optical fiber coupler 11 is rejected by the optical isolator 14 and will never enter the optical fiber 13. The optical bandpass filter 4 allows the specific wavelength $\lambda 1$ to pass and reflects the other wavelengths $\lambda 2$ to $\lambda n$ which are thus directed to the optical fiber 13.

The specific wavelength $\lambda 1$ having passed the optical bandpass filter 4 is reflected by the reflector 16, returned to the optical bandpass filter 4, and transmitted through the optical fiber 9 to the optical circulator 8 before dropped from the output optical fiber 6.

When a wavelength component $\lambda 1$ is fed into the input optical fiber 7, it travels through the optical circulator 8 to the optical fiber 9. The wavelength component $\lambda 1$ is then passed through the optical bandpass filter 4, reflected by the reflector 16, and returned to the optical bandpass filter 4. The wavelength component $\lambda 1$ is now transmitted along the optical fiber 12 to the optical fiber coupler 11 where it is mixed with the wavelengths λ2 to λn from the optical fiber 13. A resultant sum signal of the full wavelengths λ1 to λn is finally transmitted to the output optical fiber 2. At the same time, any output from the port a of the optical fiber coupler 11 is rejected by the optical isolator 10.

According to the fourth embodiment, the specific wavelength λ1 passes the optical bandpass filter 4 two times in either the input or output mode and will thus be enhanced with its marginal portion suppressed as compared with the single pass operation. For example, assuming that the optical bandpass filter 4 has a compression ratio of 10 dB at a distance of 1 nm away from its center wavelength, the arrangement of this embodiment can increase the compression ratio to as high level as 20 dB.

Figure 6:
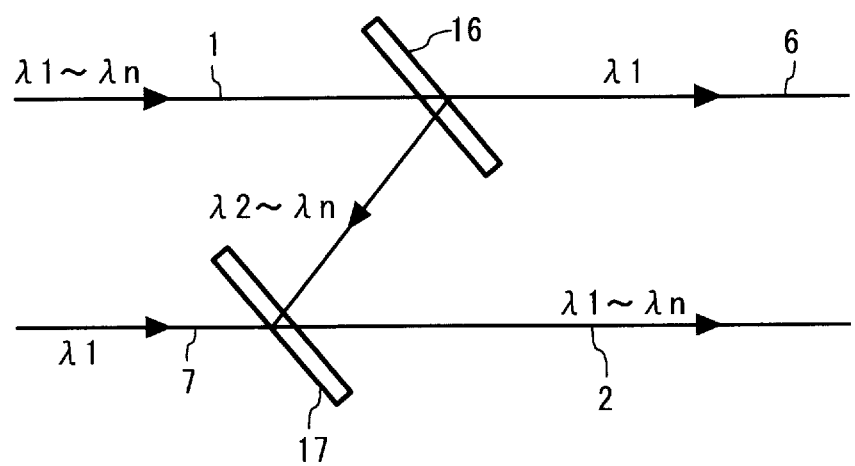
FIG. 6 is a diagram explaining a fifth embodiment of the present invention.

A fifth embodiment of the present invention is now described referring to FIG. 6. This embodiment features two units of the optical bandpass filters. As shown, two optical bandpass filters 16 and 17 are provided for passing the specific wavelength λ1 of a light signal while the other components denoted by numerals are identical or similar to those of FIG. 1.

When an n-wave signal having the wavelengths λ1 to λn is fed into the input optical fiber 1, its specific wavelength λ1 passes through the optical bandpass filter 16 to the output optical fiber 6. The remaining wavelengths λ2 to λn are rejected by the optical bandpass filter 16 and directed to the second optical bandpass filter 17. Simultaneously, a wavelength component λ1 to be added is introduced from the input optical fiber 7 and mixed with the wavelengths λ2 to λn at the second optical bandpass filter 17. A resultant sum signal is then transmitted to the output optical fiber 2.

Figure 7:
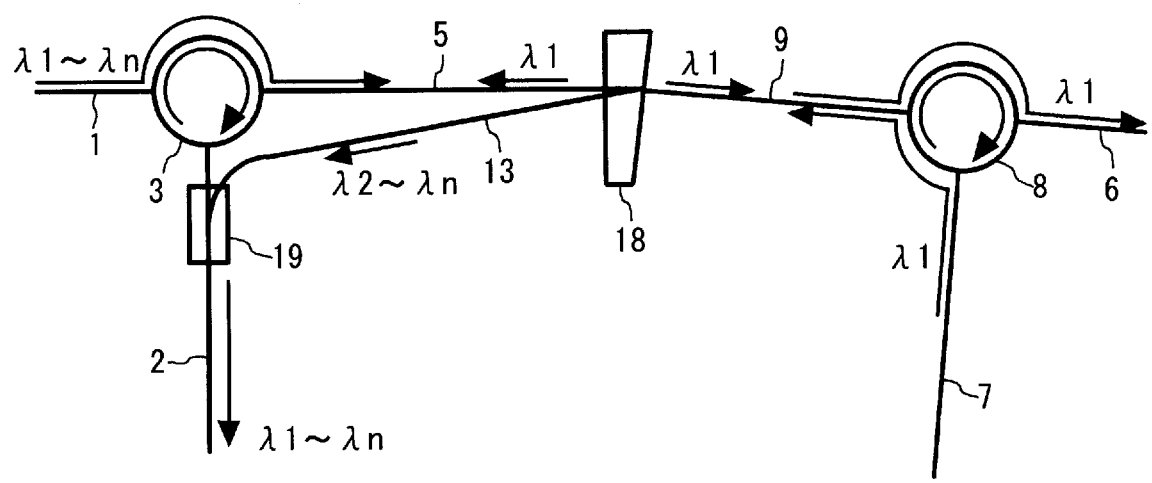
FIG. 7 is a diagram explaining a sixth embodiment of the present invention.
Figure 8:
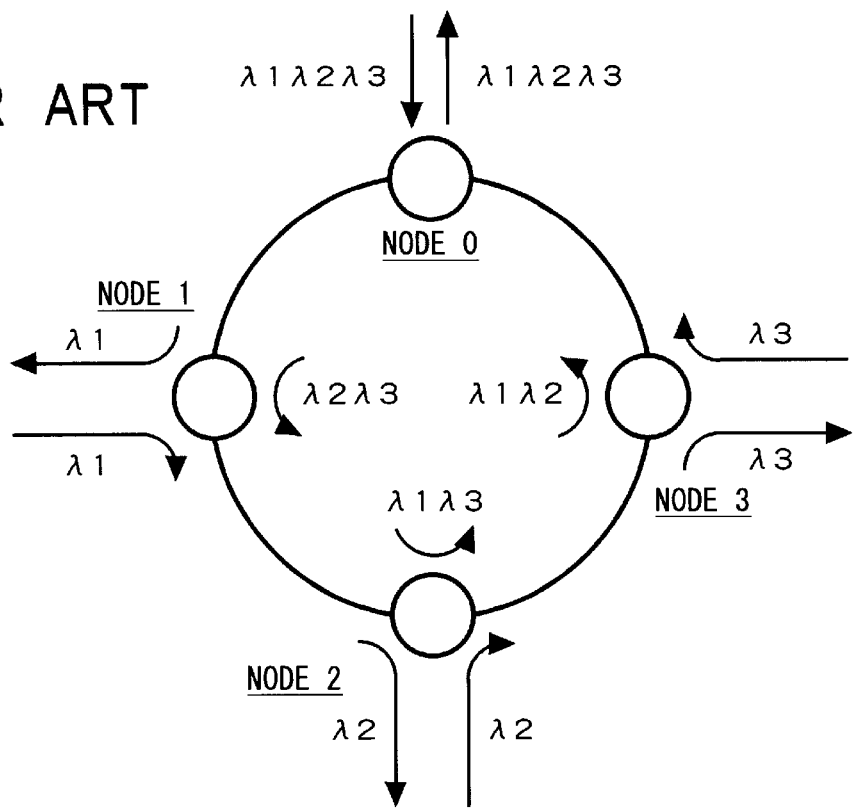
FIG. 8 is a schematic diagram showing a ring-shaped type of the optical wavelength-division multiplex communications network.
Figure 9:
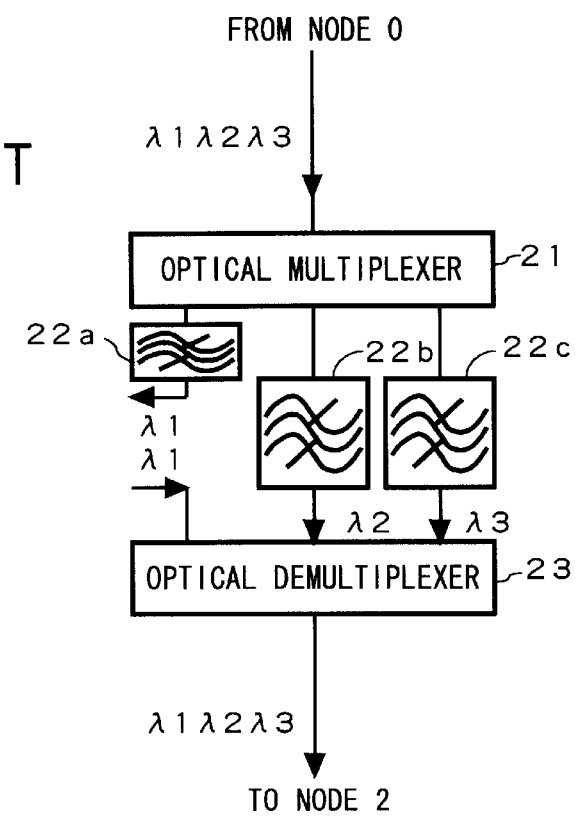
FIG. 9 is a block diagram explaining the arrangement of a conventional optical ADM apparatus.

A sixth embodiment of the present invention is described referring to FIG. 7. This embodiment features a trapezoid shape in cross section of an optical bandpass filter 18 for passing the specific wavelength λ1.

When an n-wave signal having the wavelengths λ1 to λn is fed into the input optical fiber 1, it travels through the optical circulator 3 and the optical fiber 5 to the trapezoid shaped optical bandpass filter 18 where its specific wavelength λ1 is passed while the other wavelengths λ2 to λn are rejected. The specific wavelength λ1 passed through the trapezoid shaped optical bandpass filter 18 is transmitted through the optical fiber 9 and the optical circulator 8 and released from the output optical fiber 6. Meanwhile, a wavelength component λ1 to be added is introduced from the input optical fiber 7 and directed through the optical circulator 8, optical fiber 9, trapezoid shaped optical bandpass filter 18, optical fiber 5, and optical circulator 3 to an output coupler 19 where it is mixed with the wavelengths λ2 to λn rejected by the trapezoid shaped optical bandpass filter 18 and fed from the optical fiber 13. A resultant sum signal is then released from the output optical fiber 2. Accordingly, the add and drop action on the optical signal in the sixth embodiment is achieved successfully.

As set forth above, the optical ADM apparatus according to the present invention employs a combination of two optical circulators and an optical bandpass filter, or of an optical coupler, an optical circulator, and an optical bandpass filter. Hence, its design is more simple and less costly than that of any conventional ADM apparatus in which a plurality of optical bandpass filters are used for passing their respective wavelength components of an optical wavelength-division multiplexed signal. Also, the optical ADM apparatus of the present invention can eliminate a trouble of interference between optical signals which is innate in the conventional apparatus.

With its optical bandpass filter arranged continuously variable, for example, along the x axis, in the center wavelength to be passed, the optical ADM apparatus of the present invention becomes compatible with any modification of the network system. As the optical ADM apparatus of the present invention is easily feasible, its function is guaranteed.

What is claimed is:

1. An optical add-drop multiplexer for extracting a specific wavelength from an optical wavelength-division multiplexed signal an optical component of which wavelength is identical to the extracted specific wavelength, comprising:

a first optical circulator for directing a light signal introduced from a first input optical fiber to a first optical fiber and a light signal introduced from the first optical fiber to a first output optical fiber;

an optical bandpass filter for passing a specific wavelength of the light signal received from the first optical fiber to a second optical fiber while rejecting and directing the other wavelength components of the light signal to the first optical fiber; and a second optical circulator for directing the specific wavelength received from the second optical fiber to a second output optical fiber and simultaneously directing to the second optical fiber an optical component of which wavelength is identical to the specific wavelength and received from a second input optical fiber, in particular, the optical component received from the second input optical fiber being passed through the optical bandpass filter to the first optical fiber, wherein a center wavelength to be passed in the optical bandpass filter is variable along a direction perpendicular to the light path so that it is adjusted for desired wavelength add and drop operations by dislocating the optical bandpass filter in the perpendicular direction.

2. An optical add-drop multiplexer for extracting a specific wavelength from an optical wavelength-division multiplexed signal and adding to the optical wavelength-division multiplexed signal an optical component of which wavelength is identical to the extracted specific wavelength, comprising:

an optical coupler for directing a light signal introduced from a first input optical fiber and an optical isolator to a first optical fiber and a light signal introduced from the first optical fiber to a first output optical fiber;

an optical bandpass filter for passing a specific wavelength of the light signal received from the first optical fiber to a second optical fiber while rejecting the other wavelength components of the light signal;

a third optical fiber for directing the light signal components rejected by the optical bandpass filter via an optical isolator to the optical coupler; and a second optical circulator for directing the specific wavelength received from the second optical fiber to a second output optical fiber and simultaneously directing to the second optical fiber an optical component of which wavelength is identical to the specific wavelength and received from a second input optical fiber, in particular, the optical component received from the second input optical fiber being mixed by the optical coupler with the light signal components rejected by the optical bandpass filter and then, a resultant sum signal being directed to the first output optical fiber.

3. An optical add-drop multiplexer according to claim 2, wherein the center wavelength to be passed in the optical bandpass filter is variable along a direction perpendicular to the light path so that it is adjusted for desired wavelength add and drop operations by dislocating the optical bandpass filter.

4. An optical add-drop multiplexer according to claim 2, further comprising a reflector for reflecting back the specific wavelength of the light signal having passed the optical bandpass filter to the optical bandpass filter so that the specific wavelength runs along the second optical fiber and then is dropped from the second optical circulator through which the optical component to be mixed is introduced in turn.

5. An optical add-drop multiplexer for extracting a specific wavelength from an optical wavelength-division multiplexed signal and adding to the optical wavelength-division multiplexed signal an optical component of which wavelength is identical to the extracted specific wavelength, comprising:

a first optical circulator for directing a light signal introduced from a first input optical fiber to a first optical fiber and a light signal introduced from the first optical fiber to a first output optical fiber;

an optical bandpass filter of a trapezoid shape in cross section for passing a specific wavelength of the light signal received from the first optical fiber to a second optical fiber while rejecting and directing the other wavelength components of the light signal to a third optical fiber;

a second optical circulator for directing the specific wavelength received from the second optical fiber to a second output optical fiber and simultaneously directing to the second optical fiber an optical component of which wavelength is identical to the specific wavelength and received from a second input optical fiber; and an optical coupler for mixing the optical component received from the first optical fiber with the other wavelength components rejected by the trapezoid shaped optical bandpass filter, in particular, the optical component introduced from the second input optical fiber being passed through the trapezoid shaped optical bandpass filter to the first optical fiber.

* * * * *